Sept. 29, 1925. Re. 16,176

L. SIEBERT

SAFETY SWITCH MECHANISM

Original Filed Oct. 17, 1921

L. Siebert INVENTOR

BY

Harry T. Tottin

ATTORNEY

Reissued Sept. 29, 1925. Re. 16,176

UNITED STATES PATENT OFFICE.

LESTER SIEBERT, OF SAN FRANCISCO, CALIFORNIA, ASSIGNOR TO DRENDELL ELECTRICAL & MANUFACTURING CO. INC., OF SAN FRANCISCO, CALIFORNIA, A CORPORATION OF CALIFORNIA.

SAFETY SWITCH MECHANISM.

Original No. 1,491,278, dated April 22, 1924, Serial No. 508,405, filed October 17, 1921. Application for reissue filed October 21, 1924. Serial No. 745,001.

*To all whom it may concern:*

Be it known that I, LESTER SIEBERT, a citizen of the United States, residing in the city and county of San Francisco and State of California, have invented certain new and useful Improvements in Safety Switch Mechanism, of which the following is a specification.

The present invention relates to a safety switch mechanism for precluding accidental contact with the switch lever or fuse terminals during such time as the switch is in closed position, and for precluding accidental contact with the stationary or live contact jaw when the switch is disengaged therefrom, and the invention relates to that type of apparatus illustrated in my co-pending application Serial No. 298,116, filed May 19th, 1919.

Among the advantages of the present invention are the provision of a means controlled by the opening and closing of the switch lever for protecting the live contact jaw on the disengagement of the switch therefrom; the provision of means whereby a shield or protector for the fuse and fuse terminals is held in locked position by the position of the switch lever, and is released at such time as the lever is moved to open position; to provide means whereby the protector for the live jaw contact is capable of being locked thereover precluding the closing of the switch lever.

The present invention has numerous advantages from a point of safety over lever switch constructions as at present manufactured, in that its use precludes the changing of a fuse by an inexperienced person, during such time as the switch is in closed position. It also precludes accidental contact with the lever when the same is in closed position, and prevents access being had to the stationary contact jaw when the same is engaged by the lever. The invention precludes the accidental contact with the stationary contact jaw by the automatically moving thereover of a protector designed to conceal the same when the lever is disengaged therefrom.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1:
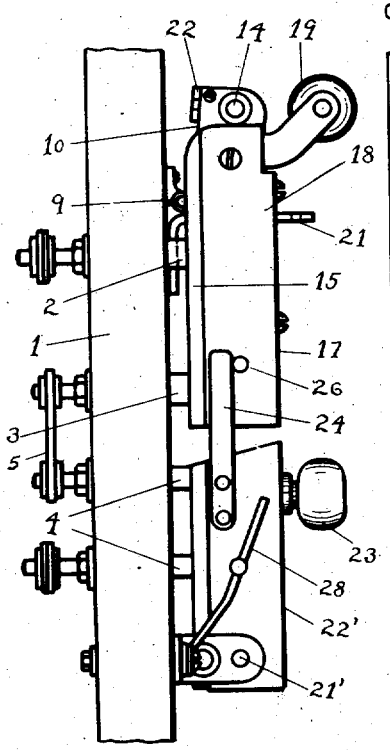
Figure 1 is a view in side elevation of the preferred embodiment of my invention, with the fuse shield and switch lever or blade in closed position, the latter locking the former from being opened.

In the drawings, wherein like characters of reference designate corresponding parts throughout the several views, 1 indicates a base or support, which carries on its surface a conventional stationary contact jaw 2, the lever or blade fulcrum support 3 and the fuse terminals 4, said parts 3 and 4 being illustrated as connected beneath the base by a conductor 5, and the fuse terminals being connected by a suitable fuse 6. A blade or switch lever 7 is pivotally mounted, as at 8, on the upper end of the part 3 and is adapted for swinging movement to engage the contact jaw 2, which is illustrated as being the live contact at all times. In the present illustration, a three blade switch is illustrated, but it is apparent that the invention is equally adapted for use in connection with one blade switches, and to simplify the description of the present invention, the following specification is written in the singular, as it will be readily understood that a switch containing any number of blades may be employed.

Hinged as at 9 to the base 1 immediately in advance of the stationary contact jaw 2 is a suitable jaw protector provided with the rear wall 10, top wall 11 and end walls 12, but one of which is illustrated in the drawing. The front of said protector is open to receive the contact jaw 2, and said protector is adapted to be swung upwardly by the tension of a spring 13 in the hinge part thereof. Preferably at each end, said jaw protector carries idler rollers 14, and with the same are adapted to contact the lower terminal side edges 15 of a blade shield 16. The shield 16 is provided with a top wall 17 and downwardly extending side walls 18, which are adapted to ride on the members 14 when the lever is moved to approximately closed position. The shield 16 encloses the blade or lever 7 and the same is secured thereto to pivot therewith, and when the lever is in closed position engaging the jaw 2, the lower edges of the side walls of the shield extend approximately into contacting relation with the surface of the base 1, and protect the blade or lever and jaw 2 from accidental contact. A handle 19 affords a means for operating the lever 7. Extending upwardly from the base 1, at one end of the protector 10 is a blade 20 formed with a locking aperture 21, and which is adapted to register with an apertured plate 22 on the end of the protector 10, when said protector is in a position of alignment with the jaw 2, said blades 20 and 22 with their aligned ports affording a means for locking the protector concealing said jaw 2 and preventing the closing of the blade or switch 7.

Fulcrumed on an axis 21′ parallel to the fulcrum point 8 of the blade or lever 7 is a fuse shield 22′ substantially U-shaped in cross section and of a length adapted when overlying said terminals 4, and enclosing the fuse 6 therein, to be disposed with its free end in slight spaced relation with the rear of the blade shield 16. Like the shield 16, the side walls of the shield 22′ extend in close proximity to the surface of the base 1 when the shield 22′ is in closed position overlying contacts 4, as in Figure 1, precluding accidental contact with said contacts 4, as above explained.

Figure 2:
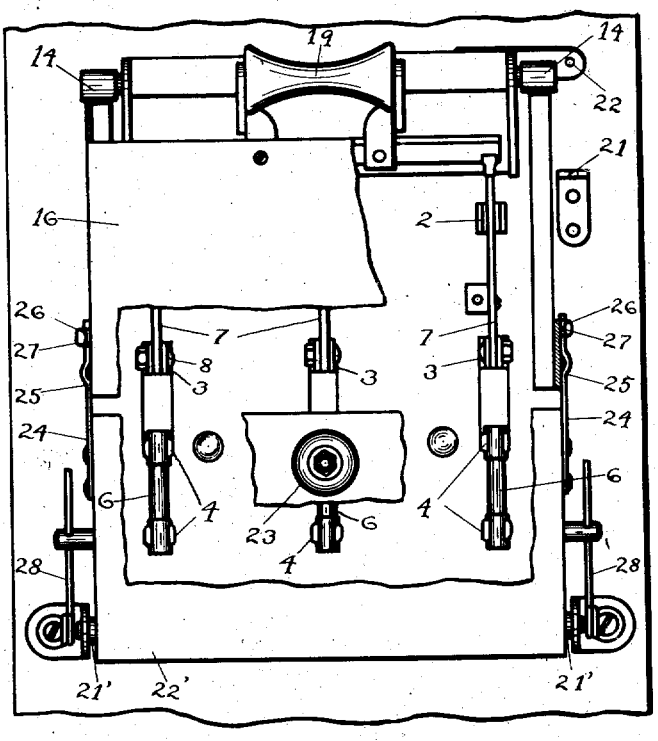
Figure 2 is a view in broken top plan of the invention illustrated in Figure 1.
Figure 3:
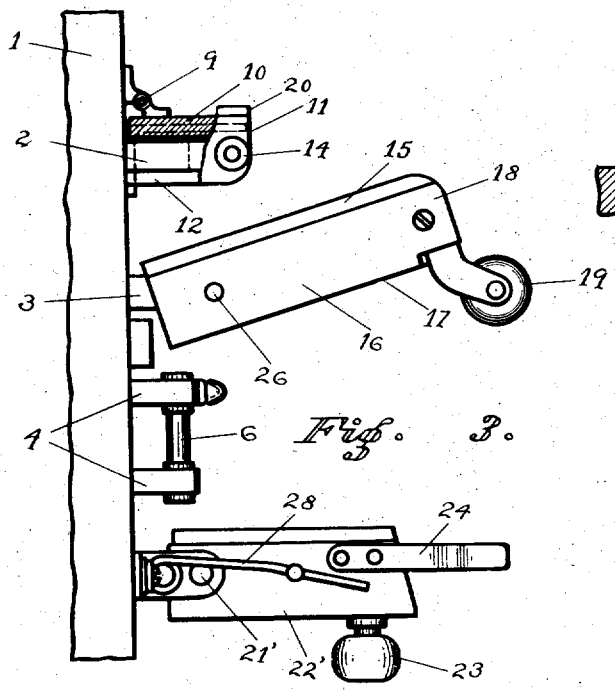
Figure 3 is a view similar to Figure 1 with the switch in open position and illustrating the fuse shield raised exposing the fuse, also the jaw protector in a position overlying the stationary contact jaw.
Figure 4:
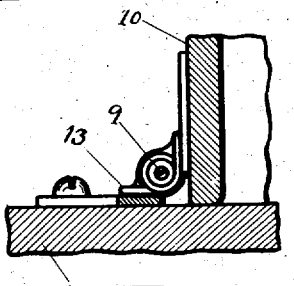
Figure 4 is a detail sectional view of the operating spring and the hinge joint for the jaw protector.

The shield 22′ is provided with an operating handle or finger piece 23 to facilitate the operation thereof, and forwardly from opposite sides thereof extend the spring fingers 24, the same adjacent their outer ends being outwardly bowed or bent as at 25, as clearly illustrated in Figure 2 of the drawings. The side walls 18 of the blade shield 16, at a point offset from alignment with the blade fulcrum 8, are provided with the outwardly projecting locking pins 26 having beveled outer ends 27. The spring fingers 24 are adapted, when the shield member has reached its lowermost position, to enclose the terminals 4 and fuse 6 to ride over the beveled faces of the pins 26, and pass beneath said pins whereby the shield 22 is locked in its closed position during such time as the blade or lever 7 is in engagement with the jaw 2. On the disengagement of the blade or lever 7 from the jaw 2, a movement is imparted to the pins 26 about the blade or lever fulcrum 8, moving said pins in alignment with the outwardly bent or curved portions 25 of the fingers 24 permitting the raising of the fuse shell, at which time access can be had for replacing or renewing the fuse 6.

Closure springs 28 are provided on each side of the fuse shield 22′ to insure the movement of the same to closed position when the hand is released from the handle 23; these springs insuring the closing of the shield 22′ to conceal the contacts 4 and fuse 6 immediately on the operator releasing his grip on the handle 23.

By my present construction it will be observed that, so long as the blade or lever 7 is in engagement with the stationary contact jaw 2, access for the renewal or replacement of the fuse 6 is precluded due to the locking of the fuse shield 22 in closed position, but that said shield will be readily raised on the disengagement of the blade or lever 7 from the stationary jaw 2. It will also be apparent that, immediately on the disengagement of the blade or lever 7 from the contact jaw 2, the protector 10 is automatically moved by the spring 13 in a position to overlie and conceal the contact jaw 2, which in the present case is the live terminal at all times, and this prevents accidental contact therewith. It will also be observed that the movement of the blade or lever 7 to closed position causes the forward portions of the lower edges 15 of the side walls 18 thereof to engage the members 14 at opposite ends of the protector and pivoting said protector on its fulcrum 8 to expose the said jaw 2 for engagement by the blade or lever 7.

I claim:

1. A safety switch mechanism including a base, a stationary contact jaw carried thereby, a pivotally mounted switch lever carried by the base and movable into and out of engagement with said jaw; a shield carried by the lever for protecting the same against accidental contact, a jaw protector hingedly mounted on the base adjacent to said jaw to swing to and from said jaw; a spring for moving said protector to overlie said jaw on the disengagement of the lever therefrom, and a part associated with the jaw protector and adapted for engagement with the shield on the movement of said lever to closed position, whereby a movement is imparted to said protector to pivot the same to expose said jaw and permit the engagement of said lever therewith.

2. In combination with a single throw switch having pivotally mounted switch blades, a pair of fuse terminals adjacent thereto and in circuit therewith, a pivotally mounted shield for overlying said terminals to preclude accidental contact with the same, a spring for normally maintaining said shield in a position to overlie said terminals, and means mounted on and movable with said switch blades for locking said shield in closed position, said means permitting the independent pivotal movement of said shield when the switch blades are in circuit opening position to permit access to said fuse terminals.

3. In combination with a lever switch and its associated contacts; a pair of fuse terminals adjacent thereto and in circuit therewith; a pivotally mounted shield normally overlying said terminals; a shield mounted on the switch and movable therewith, spring fingers mounted on one of said shields; and locking parts mounted on the other one of said shields for cooperation with said fingers for locking the first mentioned shield in closed position during such time as the switch is in closed position.

4. In combination with a pivoted lever switch and its associated contacts; a pair of fuse terminals adjacent thereto and in circuit therewith; a pivotally mounted shield normally overlying said terminals; a shield mounted on and movable with the switch; spring fingers carried by the fuse shield; locking parts carried by the switch shield adapted to engage said spring fingers and lock said fuse shield in closed positions in the circuit closing position of the switch, said locking parts adapted for positioning on the opening of said switch to permit the clearance of said spring fingers, to enable the opening of the fuse shield when said switch is in open position.

5. In combination with a pivoted lever switch and its jaw contact; a pair of fuse terminals adjacent to said switch; a movable shield normally overlying said terminals; a shield enclosing said switch and movable therewith; a movable protector associated with said jaw contact and adapted for enclosing the same on the opening of said switch; and means for locking said terminal shield in closed position when said switch is closed, said means adapted for releasing on the opening of said switch.

6. In combination with a pivoted lever switch; a jaw contact with which the same engages; a shield enclosing the lever switch and movable therewith; and a movable protector carried by the base and adapted for movement to overlie said jaw contact, and a part carried thereby and adapted for engagement with the shield on the closing of said lever for removing said protector to expose said jaw contact.

7. In combination with a knife switch, a protecting shield overlying the same and pivotally movable therewith, a pair of fuse terminals, a protecting shield associated therewith for positioning to overlie and enclose the same, means for releasably locking the latter shield in fuse terminal enclosing position, and protecting means movable to cover the engaged contacts by the knife switch from accidental contact when the knife switch is disengaged therefrom.

8. In combination with a panel board, a pivotally mounted knife switch, switch jaw contacts and fuse terminals carried thereby, removable means for protecting said fuse terminals from accidental contact, a protecting covering movable with the switch for protecting the same from accidental contact when in closed position, and means carried by the panel board for protecting the jaw contacts from accidental contact when the knife switch is disengaged therefrom.

9. Protecting means for switches, wherein a switch includes a pivoted switch member movable on its pivot to circuit opening and closing positions, and fuse elements mounted adjacent and in circuit with said switch member; comprising a protecting shield movably mounted adjacent said fuse elements having means for normally holding the shield in protecting position, elements mounted on and movable with the switch member, and cooperating members on the shield adapted to be engaged in circuit closing position of said switch member by said elements to hold the shield in protecting position.

10. Protecting means for switches, wherein a switch includes a pivoted switch member movable into circuit closing and opening position; with fuse elements adjacently mounted and in circuit therewith; comprising a protecting shield pivotally mounted adjacent the fuse elements and movable to cover said elements, means for operating the shield to move and normally retain it in fuse element covering position, elements mounted on the switch member and movable therewith, cooperating elements on said protecting shield positioned for engagement by the elements on the switch member to lock the shield in covering position when the switch member is in circuit closing position, said means moving the shield and cooperating elements into covering position irrespective of the position of the switch member and carried elements.

11. Protecting means for switches, wherein a switch includes a base plate, a pivoted switch member mounted on said base plate and movable into and out of circuit closing position, and fuse elements mounted on the plate adjacent the switch member and connected thereto; comprising a cover mounted on the switch member and movable therewith, a protecting shield pivotally connected to the base plate and normally overlying the fuse elements, said cover and shield being formed for cooperation with the base plate to house the switch and fuse elements, lock members on the cover, and cooperating members on the shield for engagement by the lock members to retain the shield in position to house the fuse elements in the circuit closing position of the switch member.

12. Protecting means for switches, wherein a switch includes a base plate, a pivoted switch member mounted on the base plate, and fuse elements connected with the switch member and carried by the base plate; comprising a cover mounted on said switch member, a protecting shield pivotally mounted on the base plate and normally adapted to overlie the fuse elements, said cover and shield being provided for cooperation with each other and the base plate to completely house the switch member and fuse elements.

13. Protecting means for switches, wherein a switch includes a base plate having a pivoted switch member mounted thereon with fuse elements adjacent the switch member and connected thereto; comprising a switch cover substantially U-shape in cross section mounted on said switch member for movement therewith, the ends of said cover lying adjacent the base plate in the circuit closing position of the switch for cooperation therewith to house said switch, a shield pivotally mounted on the base plate on an axis lying in a plane parallel to the base plate and substantially common to the pivot of the switch member, and cooperating means on the switch cover and the shield for locking the shield in position to cover said fuse element when the switch member is in circuit closing relation.

14. Protecting means for switches, wherein a switch includes a base plate having a pivoted switch member thereon and fuse elements adjacent the pivoted portion of the switch member and connected thereto; comprising a U-shape cover plate mounted on and movable with the switch member, a shield for covering the fuse elements of U-shape in cross section pivotally connected to the base plate at one end and adapted to have its other end lie in adjacent relation to the end of the cover when positioned over said fuse elements, said cover and shield cooperating to house the fuse elements and switch member in one position, the legs of said cover and shield terminating adjacent the base plate in said position, and interlocking means on the cover and shield adapted to prevent pivotal movement of the shield to uncover said fuse elements when the switch member is in circuit closing relation.

15. Protecting means for switches, wherein a switch includes a base plate, a pivoted switch member mounted on the base plate, and fuse elements connected with the switch member and carried by the base plate; comprising a protecting shield pivotally mounted on the base plate and normally adapted to overlie the fuse elements, said shield having depending side extensions cooperating with the base to completely house the fuse elements, and means for locking the shield in position to prevent access to the fuse elements when the switch is closed.

In testimony whereof I have signed my name to this specification, this 4th day of April, 1925.

LESTER SIEBERT.